United States Patent [19]

Tsujino et al.

[11] Patent Number: 5,084,325

[45] Date of Patent: Jan. 28, 1992

[54] TRANSPARENT SYNTHETIC RESIN SHEET OR FILM, METHOD FOR ITS PRODUCTION AND APPLICATIONS THEREOF

[75] Inventors: Masaki Tsujino; Tadao Nakamura, both of Yokohama; Toshio Ichiki, Kawasaki; Kazuhiko Kuga, Yokohama, all of Japan

[73] Assignee: Asahi Glass Company Ltd., Tokyo, Japan

[21] Appl. No.: 493,814

[22] Filed: Mar. 15, 1990

Related U.S. Application Data

[62] Division of Ser. No. 177,459, Apr. 1, 1988, Pat. No. 4,935,264.

[30] Foreign Application Priority Data

Apr. 3, 1987 [JP] Japan .................... 62-81247
Oct. 23, 1987 [JP] Japan .................... 62-266575
Oct. 23, 1987 [JP] Japan .................... 62-266576

[51] Int. Cl.⁵ .................................................. B32B 9/00
[52] U.S. Cl. ............................... 428/192; 428/204; 428/207; 428/423.1; 428/432; 296/84.1

[58] Field of Search ............... 428/34, 432, 423.1, 428/204, 207, 192; 296/84.1

[56] References Cited

FOREIGN PATENT DOCUMENTS 735187 5/1966 Canada ....................... 428/432
2228299 1/1974 Fed. Rep. of Germany ...... 428/432

*Primary Examiner*—Patrick J. Ryan
*Assistant Examiner*—Elizabeth Evans
*Attorney, Agent, or Firm*—Oblon, Spivak, McClelland, Maier & Neustadt

[57] ABSTRACT

A method for producing a sheet or film of a transparent synthetic resin, which comprises discharging onto a continuous substrate moving in one direction a synthetic resin material for the transparent synthetic resin from a discharge die having a linear outlet extending perpendicular to the moving direction of the substrate, casting and curing or solidifying the resin material on the substrate to form a sheet or film of the transparent synthetic resin, wherein the discharge die is continuously or intermittently reciprocated in a direction substantially perpendicular to the moving direction of the substrate.

17 Claims, 4 Drawing Sheets

TRANSPARENT SYNTHETIC RESIN SHEET OR FILM, METHOD FOR ITS PRODUCTION AND APPLICATIONS THEREOF

This is a division of application Ser. No. 177,459, filed on Apr. 1, 1988, now U.S. Pat. No. 4,935,264.

The present invention relates to a method for producing a continuous sheet of a transparent synthetic resin suitable for the production of a laminated safety glazing product.

A so-called laminated glass i.e. a laminate comprising a pair of inorganic glass sheets and an interlayer, is widely used as a safety glazing product for windshield for automobiles. On the other hand, attention has been drawn in recent years to a bilayer safety glazing product having a synthetic resin layer of a single or multi-layered structure provided on the inside surface (the interior side) of a laminated glass or an inorganic glass sheet. This bilayer safety glazing product is considered to have a higher level of safety than the laminated glass, since at the time of breakage, fragments of the inorganic glass are less likely to protrude to the interior side, and the possibility of injury to the human body by such fragments is small. Especially, a bilayer safety glazing material of this type wherein a sheet of inorganic glass is used, is more advantageous than the laminated glass, since it can be made to have a light weight.

The bilayer safety glazing product of the above type (hereinafter referred to simply as BLW) is usually produced by laminating a film or sheet (hereinafter referred to simply as a sheet in the sense that this sheet includes a film) of a synthetic resin having excellent optical properties and good weather resistance on an inorganic glass sheet or on a laminated glass sheet. The synthetic resin sheet is a sheet having a single or multi-layered structure, and particularly the surface constituting the exposed surface is required to be hardly scratched, which is referred to as scratch resistance. In many cases, such a surface is formed of a hard coating film so-called hard coat, or a synthetic resin layer having a self-healing property i.e. a property whereby a scratch mark, if any, disappears as time passes. A single-layered synthetic resin sheet or each layer of a multi-layered synthetic resin sheet can be formed by casting or extrusion molding. The casting method is particularly suitable for the formation of a sheet or layer having excellent optical properties. In the case of a surface layer constituting the exposure surface of BLW or a single-layered synthetic resin sheet, it is made of a hard coating film or a cross-linked synthetic resin, whereby casting is substantially the only method for its molding.

The casting is a method wherein a flowable material is cast on a substrate surface, followed by curing or solidifying to form a layer of a sheet- or film-form. The flowable material includes a solution or dispersion of a synthetic resin, a mixture of liquid reactive materials capable of reacting and curing to form a synthetic resin, and a solution or dispersion of a mixture of liquid or solid reactive materials. In the case of a solution or dispersion, the solvent or the dispersing medium is removed by e.g. evaporation for solidification, or in some cases, a reaction for curing takes place to form a solid synthetic resin. In the case of a mixture of liquid reactive materials which contains no solvent or dispersing medium, a reaction for curing takes place to form a synthetic resin. The cast material will have a flat smooth surface by its own weight and will be solidified or cured in that state to form a layer having excellent surfacial optical properties.

A method for continuously molding a sheet for the production of a bilayer safety glazing product by casting is known and is disclosed in e.g. U.S. Pat. Nos. 4,643,944, 4,283,363, 4,605,528 and 4,590,030 and European Patents 38,760 and 133,090. This method is suitable particularly for the molding of a sheet of a polyurethane resin. In particular, by casting a reactive mixture capable of forming a polyurethane resin and containing no solvent, it is possible to mold a relatively thick sheet (e.g. 0.1 mm or thicker) in a one step casting. Further, by casting a flowable material on a preliminarily molded synthetic resin sheet, it is possible to produce a sheet having a multi-layered structure having a synthetic resin surface layer formed by the solidification or curing of the flowable material. In this case, the undercoating synthetic resin sheet may be formed by a casting method. Namely, a sheet having a multi-layered structure can be prepared by a so-called multi-step casting method.

Figure 2:
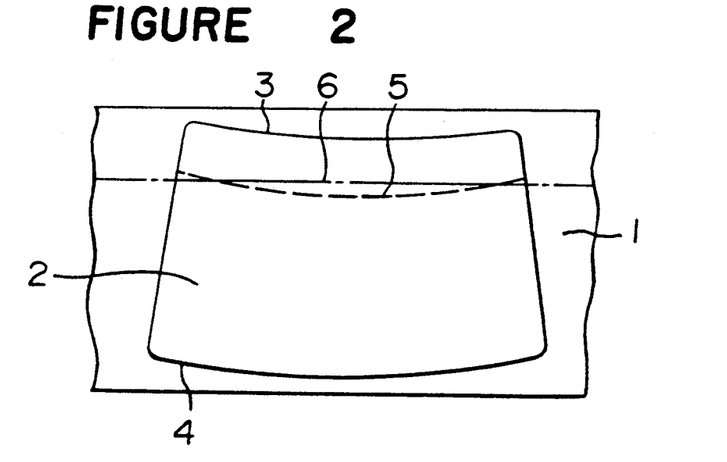
FIG. 2 is a plan view showing the relation between a sheet for BLW and a glass sheet for automobiles.

In a continuous casting method, it is common to employ a method wherein a flowable material is supplied onto the surface of a substrate moving in one direction. The formed sheet is usually a continuous sheet having substantially a constant width. Such a sheet is cut into a prescribed length for its lamination onto e.g. an inorganic glass sheet. A windshield for an automobile is usually bulged forward of the automobile and its longer sides are arcuate downwards. Accordingly, the sheet cut out from the continuous sheet has a fan shape with the longer sides being substantially arcuate. FIG. 2 shows a plan view of a continuous sheet. The continuous sheet 1 is continuous in the left-right direction in the Figure, and the sheet 2 cut out therefrom has a fan shape with its longer sides 3 and 4 being downwardly arcuate. With this shape, the upper central portion above the upper longer side of the cut out sheet 2 and both side portions below the lower longer side of the cut out sheet 2, of the continuous sheet 1 will be wasted without being used. These waste portions are not economically negligible. Particularly when the radius of curvature of the arcuate longer sides becomes small as the complexity in the shape of the windshield of an automobile advances in future, the area of these waste portions is considered to increase, and a certain measure will then be required.

On the other hand, in order to reduce the glaring which the driver receives from the windshield of an automobile, it has been in practice to reduce the transmission of light by coloring the upper portion of the windshield. In the case of a laminated glass, such a windshield is produced by using an interlayer colored in a strip-shape along the upper portion. As mentioned above, the top side of the windshield is roughly arcuate, but as observed from the front, it is substantially linear on its appearance. For this purpose, the width of the strip-shaped colored portion of the cut out sheet is required to be substantially constant. For example, in FIG. 2, the boundary line 5 between the colored strip portion and the non-colored portion is required to be downwardly arcuate in substantially parallel with the upper longer side 3. The portion between this boundary line 5 and the upper longer side 3 is a colored portion. In the case of an interlayer made of e.g. a polyvinyl butyral resin, a sheet having a linear colored strip portion is non-uniformly stretched so that the colored strip portion will be downwardly arcuate. For example, in FIG. 2, the sheet 1 having a linear boundary line 6 (the portion above the boundary line 6 is the colored portion) is non-uniformly stretched by using a conical roll in such a manner that the stretching ratio in the left-right direction in the Figure is small at the upper portion and large at the lower portion so that the boundary line 6 changes to a boundary line 5.

In order to conduct such non-uniform stretching, the sheet 1 must be plastic. However, as mentioned above, in the case of a sheet for BLW, it is usual that at least the sheet constituting the exposed surface is a hard coat film or a cross-linked synthetic resin, which has low or little plasticity. Accordingly, it is hardly possible to obtain a sheet having an arcuate strip-shaped colored portion as mentioned above by non-uniform stretching from a sheet having a straight strip-shaped colored portion.

It is possible to partially color the surface of the synthetic resin layer after the preparation of BLW, to obtain a partially colored BLW as mentioned above. However, this method of coloring leads to economical disadvantage since the productivity is thereby low. Further, with a view to improving the surface property such as the stain resistance of the surface of the synthetic resin layer, the permeability of a colarant may well be poor depending upon the material of the surface, whereby the subsequent coloring operation will be difficult.

It is an object of the present invention to overcome the above problems in the casting method by reciprocating a discharge die for supplying a synthetic resin material in a direction substantially perpendicular to the direction of the movement of the continuous substrate.

Thus, the present invention provides a method for producing a sheet or film of a transparent synthetic resin, which comprises discharging onto a continuous substrate moving in one direction a synthetic resin material for the transparent synthetic resin from a discharge die having a linear outlet extending perpendicular to the moving direction of the substrate, casting and curing or solidifying the resin material on the substrate to form a sheet or film of the transparent synthetic resin, wherein the discharge die is continuously or intermittently reciprocated in a direction substantially perpendicular to the moving direction of the substrate.

The present invention also provides an elongated sheet or film of a transparent synthetic resin having a uniform thickness and smooth surface, which comprises a colored transparent strip zone (A) of a colored transparent synthetic resin (a) extending in the longitudinal direction of the sheet or film and a transparent strip zone (B) of a transparent synthetic resin (b) which is substantially the same as the colored transparent synthetic resin (a) except for the difference in color, the zone (B) extending in the longitudinal direction of the sheet or film, with the boundary of the zones (A) and (B) being partially curved.

Furthermore, the present invention provides a laminated safety glass glazing product such as BLW wherein a sheet cut out from the elongated continuous sheet or film is employed.

Now, the present invention will be described in further detail with reference to the preferred embodiments.

Figure 1:
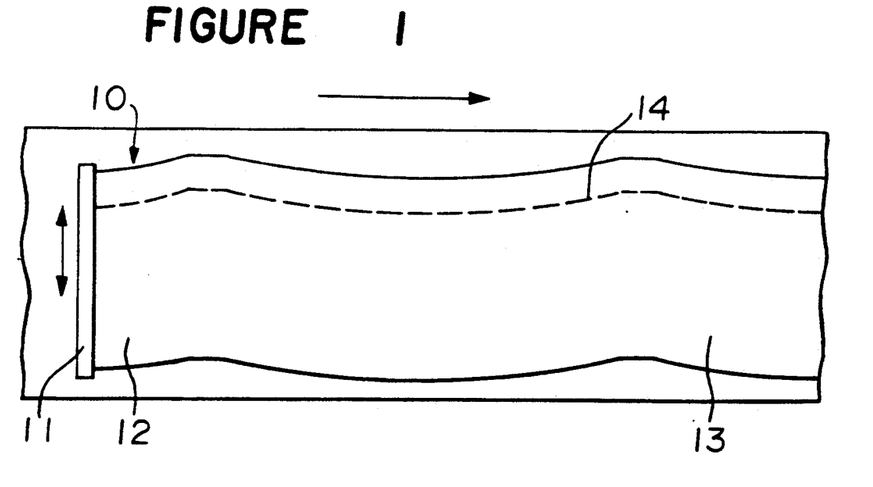
FIG. 1 is a diagrammatical cross-sectional view of a casting apparatus to be referred to for the description of the method of the present invention.

FIG. 1 is a diagrammatical plan view of a casting apparatus to be referred to for the description of the method of the present invention. Onto a continuous substrate 10 moving continuously to the right hand side direction in the Figure, a synthetic resin material 12 is supplied from a discharge die 11 having a linear outlet extending substantially perpendicular to the moving direction of the substrate. The synthetic resin material 12 is cast on the continuous substrate 10, followed by curing to form a smooth flat continuous sheet 13. The discharge die 11 supplies the synthetic resin material while continuously or intermittently reciprocating in a direction substantially perpendicular (as shown) to the moving direction of the continuous substrate 10. If the discharge die 11 is reciprocated in a simple harmonic motion relative to the continuous substrate 10 moving at a constant speed, the sheet thereby obtained will be a continuous sheet with a sine curve. Further, the curvature can be changed by changing the reciprocating speed of the discharge die 11. Furthermore, continuous sheets of various shapes may be prepared by temporarily stopping the reciprocation of the discharge die 11 or by changing the speed of the reciprocating movement thereof. FIG. 1 illustrates the shape of a continuous sheet 13 in a case where the discharge die 11 was reciprocated in a simple harmonic motion except that it was temporarily stopped at the upper end in the Figure.

By using the sheet obtained by the method of the present invention, the aforementioned problem can be solved. Namely, by approximating the upper and lower curves of the sheet 13 to the curves of the upper and lower longer sides 3 and 4 in FIG. 2, the waste portions of the sheet can be minimized, thus bringing about an economical advantage. Furthermore, there will be a significant advantage in that it is possible to obtain a sheet 13 having a colored strip zone with a curved boundary line 14 by simultaneously supplying a colored synthetic resin material and non-colored synthetic resin material 12 from the discharge die 11 side by side along the longitudinal direction thereof onto the continuous substrate 10.

Figure 3:
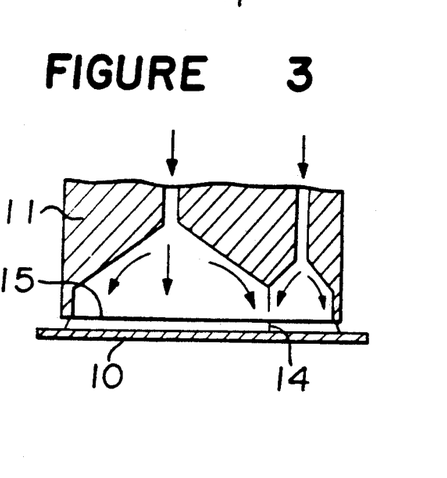
FIG. 3 is a cross-sectional view showing the cross section in the width direction (i.e. the top-bottom direction in the Figure) of a discharge die in FIG. 1.
Figure 4:
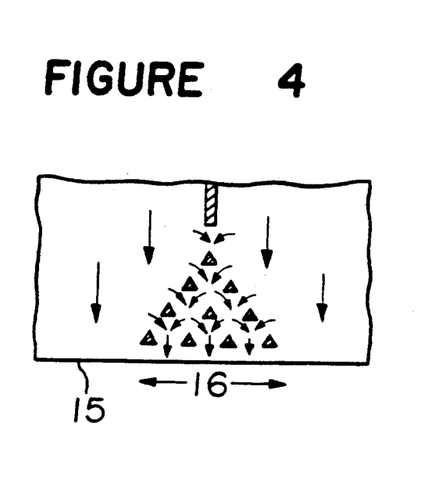
FIG. 4 is a cross-sectional view of a discharge die having a structure different from the discharge die shown in FIG. 3.

FIG. 3 shows a cross section in the width direction (i.e. the top-bottom direction in the Figure) of the discharge die 11 of FIG. 1. To the discharge die 11 movable in the left-right direction in the Figure, a colored synthetic resin material (a') and a non-colored synthetic resin material (b') are supplied, and they are discharged from the front end 15 onto the continuous substrate 10, whereby a continuous sheet comprising a colored portion (A) and a non-colored portion (B) side by side with a boundary line 14 will be obtained. The boundary line may preferably be not distinct. Namely, it is preferred to mix or overlap the two materials at the boundary region in the discharge die 11 so that the color density gradually decreases from the colored portion (A) to the non-colored portion (B) in order to form a so-called "gradation" portion. FIG. 4 shows a partial cross section of a discharge die having such a mixing section. By providing a mixing section as shown in the Figure, the colored synthetic resin material (a') and the non-colored synthetic resin material (b') are mixed at such a section and then discharged to form a boundary region 16 with a certain width. The mixing section is not limited to the illustrated static mixing means, and a forcible mixing means or a diffusion mixing means by taking a long contact time of the two materials, may also be employed. Further, instead of mixing, the two materials may be overlapped so that the ratio of the thicknesses of the two materials changes to form a similar boundary region.

Figure 5:
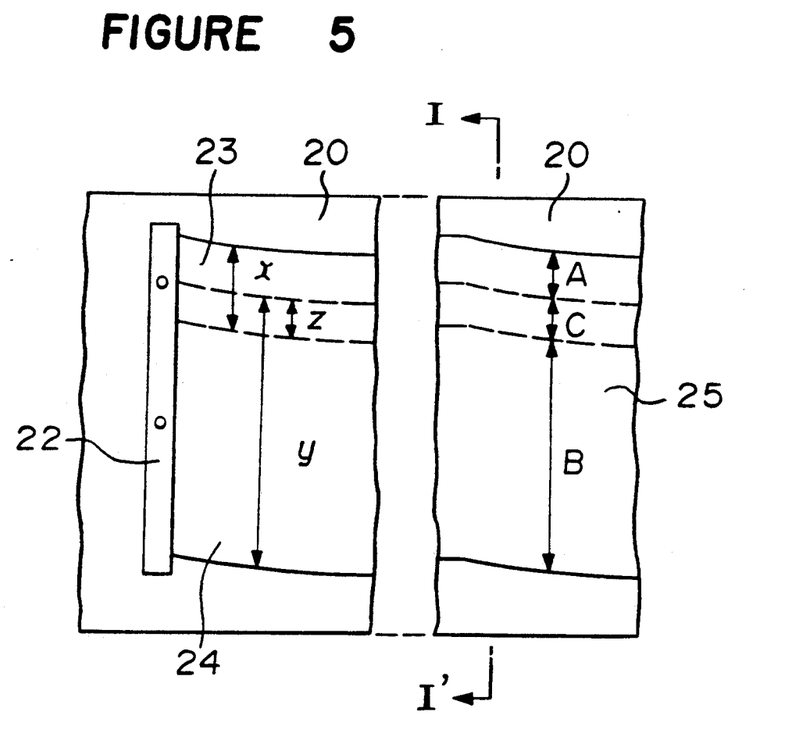
FIG. 5 is a diagrammatical plan view of a casting apparatus which is different from the casting apparatus in FIG. 1.

FIG. 5 is a diagrammatical plan view of a casting apparatus for illustrating another embodiment of the method for producing the synthetic resin sheet of the present invention.

Figure 6:
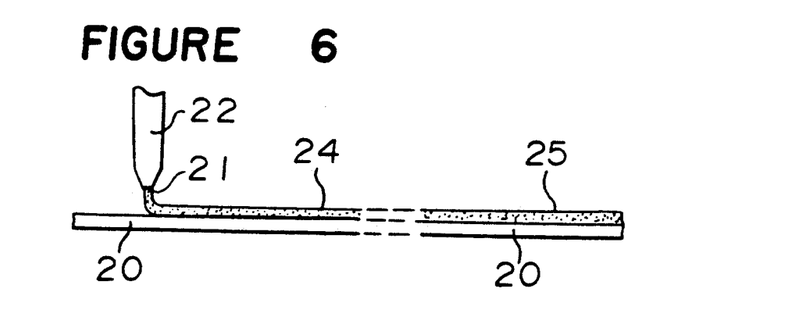
FIG. 6 is a side elevation of the apparatus of FIG. 5.

FIG. 6 is a side elevation thereof illustrating the apparatus in an enlarged scale in the thickness direction of the sheet. Onto a continuous substrate 20 moving continuously to the right hand side direction in the Figure, two types of synthetic resin materials (a') 23 and (b') 24 are supplied from a discharge die 22 having a linear outlet 21. The synthetic resin materials (a') 23 and (b') 24 are cast on the continuous substrate 20 in a partially overlapped state, followed by curing in a heating furnace (not shown) to form an elongated transparent synthetic resin sheet 25 having a uniform thickness and flat smooth surface. Thus, the sheet 25 comprises a colored transparent strip zone (A) of a colored transparent synthetic resin (a) formed by the curing of the synthetic resin material (a') 23, a transparent strip zone (B) of a transparent synthetic resin (b) formed by the curing of the synthetic resin material (b') 24, and a transparent boundary strip zone (C) where the two synthetic resins are overlapped as illustrated. When the width of the spread of the synthetic resin material (a') 23 is designated as x, the width of the spread of the synthetic resin material (b') 24 is designated as y, and the width of the spread of the overlapping portion of the two materials is designated as z, as shown in FIG. 5, the width of the zone (A) is represented by x-z, and the width of the zone (B) is represented by y-z, and the width of the zone (C) is represented by z.

Figure 7:
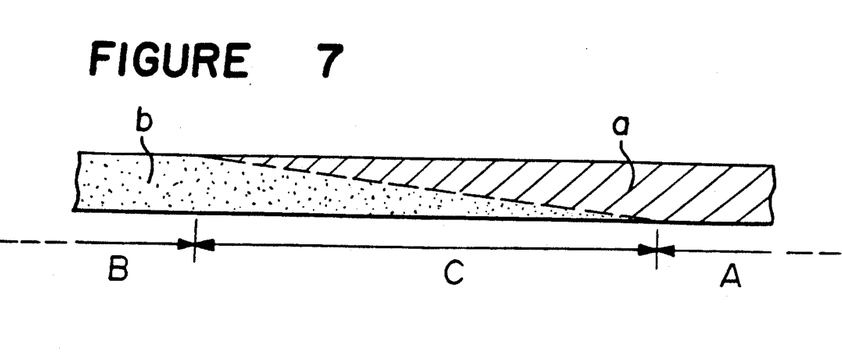
FIG. 7 is a partial cross-sectional view showing the cross section of the sheet shown in FIG. 5.

The synthetic resin sheet 25 is an elongated sheet extending in the left-right direction in FIG. 5. This sheet 25 comprises the colored transparent strip zone (A), the transparent strip zone (B) and the transparent boundary strip zone (C) extending, respectively, in the longitudinal direction of the sheet, with their boundaries (i.e. the boundary between the zones (A) and (C) and the boundary between the zones (B) and (C) being parallel to each other and curved. This transparent boundary strip zone (C) is the above-mentioned "gradation" portion. For example, when the transparent strip zone (B) is made of a colorless transparent synthetic resin, the color density in the transparent boundary strip zone (C) increases gradually in the width direction from the transparent strip zone (B) to the colored transparent strip zone (A). FIG. 7 is an enlarged partial cross-sectional view showing the cross section taken along I-I' in FIG. 5. However, the cross section is enlarged more in the thickness direction than the width direction of the sheet. The colored transparent strip zone (A) is made of a colored transparent synthetic resin (a). The transparent strip zone (B) is made of a transparent synthetic resin (b) which is substantially the same as the colored transparent synthetic resin (a) except for the difference in color. This transparent synthetic resin (b) is preferably a colorless transparent synthetic resin or a colored transparent synthetic resin which is colored with a different color or with a different color density from the colored transparent synthetic resin (a). Particularly preferred is a colorless synthetic resin or a colored synthetic resin which is colored in a less degree with the same type of color as the colored transparent synthetic resin (a). The synthetic resins (a) and (b) are preferably substantially the same synthetic resins (substantially the same not only in the types but also in the compositions and physical properties), and more preferably they are the same synthetic resins except for the difference in color or in the presence or absence of the color.

In the transparent boundary strip zone (C), the colored transparent synthetic resin (a) and the transparent synthetic resin (b) are overlapped to each other, as shown in FIG. 7. It is preferably a zone wherein the thickness of the layer of the colored transparent synthetic resin (a) and the thickness of the layer of the transparent synthetic resin (b) are gradually changed in the width direction (the left-right direction in the Figure) of the sheet. Namely, it is preferably a zone wherein the thickness of the layer of the colored transparent synthetic resin (a) becomes gradually thin and the thickness of the transparent synthetic resin (b) becomes gradually thick from the side where the zone (C) is in contact with the zone (A) towards the side where the zone (C) is in contact with the zone (B) (the total thickness of the two-layers being the same at any position). In the zone (C), either one of the layers of the colored synthetic resin (a) and the transparent synthetic resin (b) may be on the top of the other (although the two surfaces of the sheet may be distinguished in the sense that one of them is formed to be in contact with the substrate, and the other is formed to be not in contact with the substrate).

The boundary surface (the cross section of which is represented by a dotted line in FIG. 7) in the transparent boundary strip zone (C) where the colored transparent synthetic resin (a) and the transparent synthetic resin (b) are in contact with each other is not necessarily distinct. This boundary surface is a surface formed by the contact of the two-types of flowing synthetic resin materials. Therefore, as microscopically observed, the two types of materials diffuse or mix at the boundary surface by the formation of turbulent flow. However, as observed macroscopically, the boundary surface exists, and the color is gradually changed in the zone (C). Further, this boundary surface is a boundary surface with respect to the color, and it is preferred that no substantial boundary surface exists with respect to the synthetic resin. Namely, it is preferred that the two types of the transparent synthetic resins (a) and (b) are in contact with each other without any substantial discontinuity even if they form a boundary surface where discontinuity in color exists. Particularly, no substantial discontinuity in the physical properties (such as strength) of the synthetic resins must exist at such a boundary surface. However, discontinuity in other properties may be permissible. For example, the colored transparent synthetic resin (a) is required to contain a coloring agent such as a dyestuff or pigment, while the transparent synthetic resin (b) may not contain a coloring agent or may contain a different type of a coloring agent. Further, for the purpose of preventing discoloration of the coloring agent, a stabilizer such as a ultraviolet absorber may be incorporated in a substantial amount to the colored transparent synthetic resin (a), whereas no such a stabilizer or a less amount of such a stabilizer may be incorporated to the transparent synthetic resin (b). In such cases, there is a difference in the physical properties of the two types of transparent synthetic resins (a) and (b). The two types of transparent synthetic resins are most preferably substantially the same synthetic resins except for such a minor difference in the physical properties or the difference in the incorporation of a small amount of additives. This boundary surface may not be flat. For example, the cross section of the boundary surface as shown in FIG. 7 may be curved.

Figure 8A:
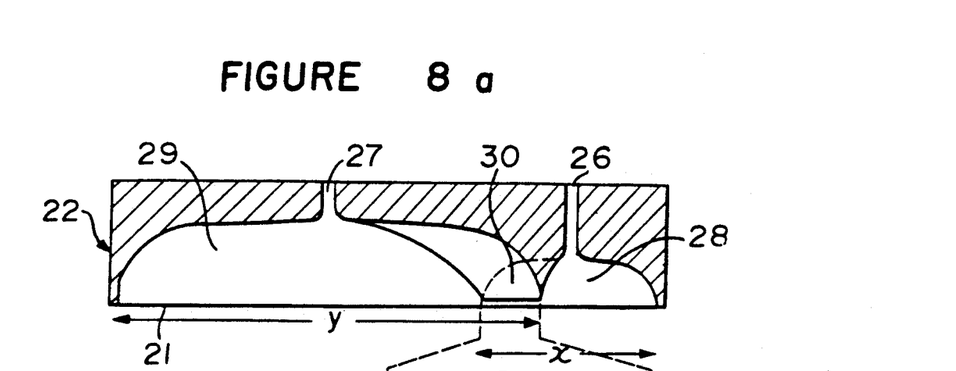
FIG. 8a is a cross-sectional view of the discharge die of FIG. 5.
Figure 8B:
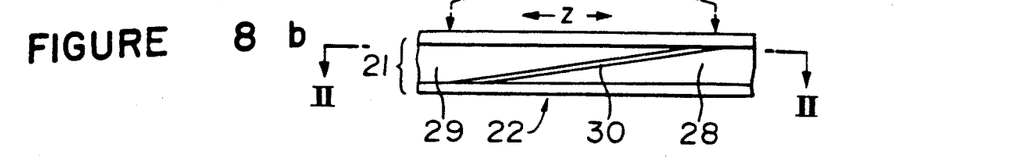
FIG. 8b is an enlarged partial bottom view thereof.

FIG. 8a is a cross-sectional view of a discharge die 12, and FIG. 8b is an enlarged bottom view thereof. The cross section of the cross-sectional view of FIG. 8a is taken along line II-II'. The discharge die 22 has a first inlet 26, a second inlet 27, a first flow path 28 enlarged in a fan-shape, a second flow path 29 enlarged in a fan-shape, a linear outlet 21 and a partition wall 30 separating the first and second flow paths and extending with its end terminated immediately before the linear outlet 21. A synthetic resin material (a') 23 is introduced from the inlet 26, flows while spreading in the flow path 28 and is discharged from the linear outlet 21. Likewise, a synthetic resin material (b') 24 is introduced from the inlet 27, passes through the flow path 29 and is discharged from the linear outlet 21. The flow paths 28 and 29 join immediately before the linear outlet 21 to form a single flow stream, and they are divided by the partition wall 30 at the up-stream side. The width of the flow path is narrow (about x-z) at the front side at the cross sectional position (cross section along line II-II') of the cross-sectional view of FIG. 8a and wide at the back side (about x). Inversely, the width of the flow path 29 is wide (about y) at the front side at the cross sectional position and narrow (about y-z) at the back side. The partition wall 30 is inclined relative to the thickness to the direction of the linear outlet 21, as shown by the bottom view of FIG. 8b. Namely, when the thickness direction of the linear outlet (the top-bottom direction in the Figure) is taken as 0° C. and the direction perpendicular thereto (the longitudinal direction of the linear outlet) is taken as 90° C., the inclination angle $\theta$ is within a range of $0 < \theta < 90$. The closer the inclination angle to 90° C., the wider the width of z. The closer the inclination angle to 0° C., the narrower the width of z. The flows of the two types of synthetic resin materials (a') 23 and (b') 24 overlap to each other at down-stream of the lower end of the partition wall 30 and they are discharged from the linear outlet 21 while maintaining the overlapping relation. The width of the lower end of the partition wall 30 is not necessarily the same as the width of z, because in many cases, the width of the overlapping portion changes more or less between the lower end of the partition wall 30 to the linear outlet 21 or before the synthetic resin materials discharged from the linear outlet become viscous and the flowability is lost (in most cases, the width of the overlapping portion is enlarged).

In the present invention, the location or the shape of the partition wall 30 in the discharge die 22 is not limited to the above embodiment. For example, the lower end of the partition wall 30 i.e. the terminal end in the down-stream direction, may extend to or beyond the linear outlet 21. In such a case, the flows of the two synthetic resin materials (a') 23 and (b') 24 join and overlap immediately after being discharged from the linear outlet 21 or at a further down-stream thereof. In a case where the two materials have relatively high viscosity and flow in the flow paths mainly by laminar flow, the terminal end of the partition wall may be located at a further up-stream side.

In an extreme case, it is possible to provide a partition wall near the inlets of the discharge die so that the two flows are twisted before they are enlarged in a fan-shape and the two flows advance in a single fan-shaped flow path in a partially overlapping state and are discharged from the linear outlet.

Figure 9A:
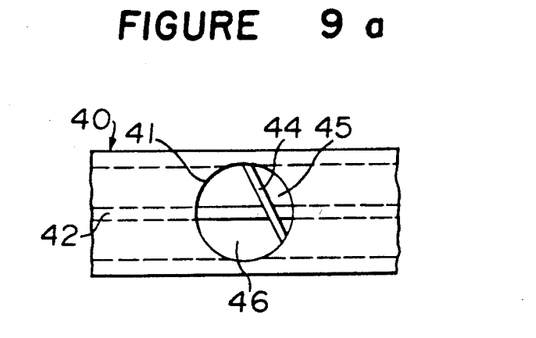
FIG. 9a is a partial plan view of another discharge die.
Figure 9B:
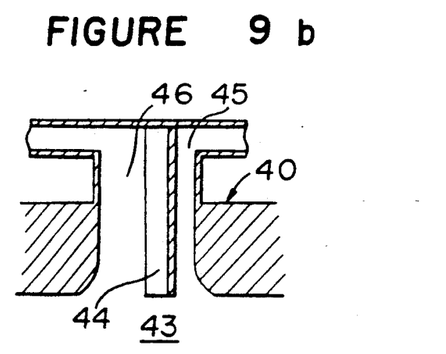
FIG. 9b is a partial cross sectional view thereof.
Figure 9C:
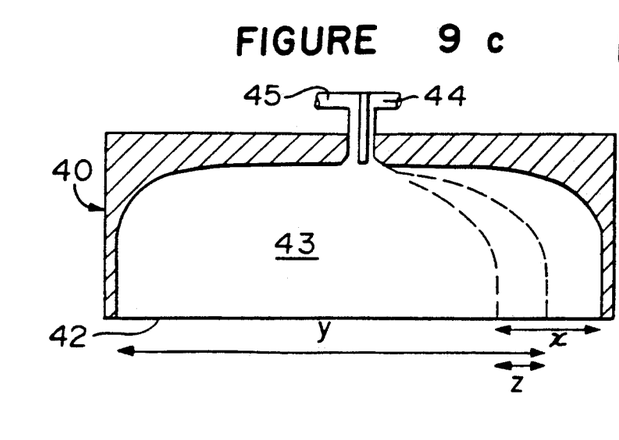
FIG. 9c is a cross-sectional view thereof.
Figure 9D:
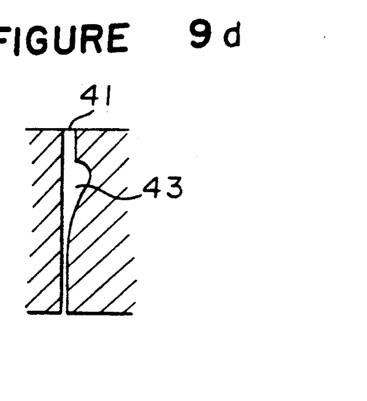
FIG. 9d is a cross-sectional view showing the cross section perpendicular to the cross section of the cross-sectional view of FIG. 9c.

FIGS. 9a to 9d illustrate another embodiment of the discharge die. FIG. 9a is a partial plan view, FIG. 9b is a partial cross-sectional view, FIG. 9c is a cross-sectional view and FIG. 9d is a transverse cross-sectional view. The discharge die has an inlet 41 for introducing a synthetic resin material and a linear outlet 42 extending in the left-right direction in the Figure. It has a fan-shaped flow path 43 enlarged in the longitudinal direction of the linear outlet from the inlet 41 to the lineart outlet 42. The inlet 41 is divided by a partition wall 44. A first synthetic resin material (a') is introduced from one divided section 45, and a second synthetic resin material (b') is introduced from the other divided section 46 in an amount substantially larger than the first material. As shown in FIG. 9a, the partition wall 44 is provided with an inclination at an angle between 0° (the top-bottom direction in the Figure) i.e. the width direction of the linear outlet 42 and 90° (the left-right direction) i.e. the longitudinal direction of the linear outlet. The flows of the two synthetic resin materials join to contact each other at the lower end of the pertition wall 44, and further advance while enlarging the width of the flow to the linear outlet 42 and are discharged therefrom.

As shown in FIG. 9c, the synthetic resin materials introduced from the inlet 41 flow downwards in the Figure while spreading in the left hand direction in the Figure and are then discharged from the linear outlet 42. The material introduced from the divided section 46 is in a larger amount than the material introduced from the other divided section 45, whereby the width of the discharge will be substantially wider than the width x of the other. Besides, the flows of the two materials are twisted by the inclined partition wall 44, whereby there will be a portion where the two materials are discharged in a overlapping manner, and the width of such a portion will be z. The cross sectional shape of the flow path 43 is as shown in FIG. 9d, whereby at the thick portion of the up-stream flow path for the materials, the respective materials mainly flow in the left-right direction in FIG. 9c and at the thin portion of the downstream flow path, the materials mainly flow downwardly as shown in FIG. 9c. The boundaries of the respective materials will be as shown by the dotted lines in FIG. 9c.

Figure 10:
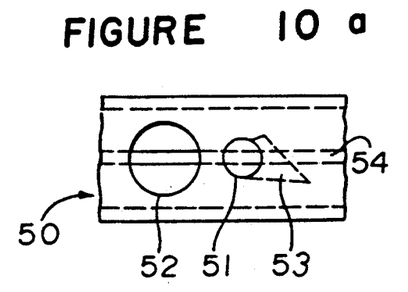
FIG. 10a is a partial plan view showing a still another discharge die.
FIG. 10b is a partial cross-sectional view thereof.

FIGS. 10a and 10b show a partial plan view (10a) and a partial cross-sectional view (10b) of a further embodiment of the discharge die. The discharge die 50 has two inlets 51 and 52. A first synthetic resin material (a') is introduced from the first inlet 51, and a second synthetic resin material (b') is introduced from the second inlet 52 in an amount substantially larger than the first material. The partition wall 53 extends from the first inlet to the right hand side in the FIG. 10a and its lower end reaches about the middle of a thick portion of the thick flow path as shown in FIG. 9d. The cross-sectional view taken along the lower end portion of this partition wall 53 is shown in FIG. 10b. In each Figure, the partition wall 53 is inclined relative to the linear outlet 54 extending the left-right direction in the Figures.

There is no particular restriction as to the shape of the above partition wall, so long as it is capable of bringing the two flows into an overlapping relation to each other. For example, in the partition wall as shown in FIG. 9, its cross sectional shape (the cross section in a direction perpendicular to the flow direction) may be not only linear as illustrated, but also in a S-shape to impart twisting to the flows in order to more effectively conduct the overlapping of the flows. The control of the width of the overlapping portion z may be conducted not only by the partition wall but also by changing the flow rate or the pressure of the two types of the synthetic resin materials.

In the method of the present invention, a T-die having the above-mentioned structure is preferred as the discharge die. The T-die includes a straight manifold type, a coat hanger type and a fish tail type. Either one of such T-dies be employed. It is particularly preferred to employ a T-die of a coat hanger type.

In the method of the present invention, as the continuous substrate, it is preferred to employ a film or sheet having no adhesive property on its surface. For example, a film or sheet of a synthetic resin such as a polyethylene terephthalate resin or a steel belt having its surface treated for non-adhesiveness is suitable. Further, the continuous substrate may be a film or sheet constituting underlayer (or in some cases, an upper layer) of a multi-layered sheet. For example, in the case of BLW of a type wherein a polyethylene terephthalate resin film having a hard coating layer is laminated on an inorganic glass sheet by means of an adhesive synthetic resin, the continuous substrate may be made of this polyethylene terephthalate resin film (a supporting substrate fixed thereunder or movable together with this film may be provided) and a hard coating material is coated and cured thereon by the method of the present invention to obtain a hardcoat-provided film for BLW.

Various means may be employed for moving the discharge die. For example, the discharge die may be driven by an electric motor or a servo motor provided with a screw. Such a driving means is preferably the one capable of controlling the speed of the movement and the cycle of the reciprocating movement as desired, whereby it is possible to produce a continuous sheet with the optimum shape or width depending upon the shape or size of BLW.

The above described casting method is usuful for producing a multi-layered sheet continuously. For example, a multi-layered sheet may be formed by a method wherein a second sheet may be laminated on a sheet formed by the above described method, or by a method wherein a second synthetic resin material is cast and cured thereon. It is particularly preferred to employ a multi-step casting method wherein a second synthetic resin material is cast and cured on the sheet formed by the above described method.

Figure 11:
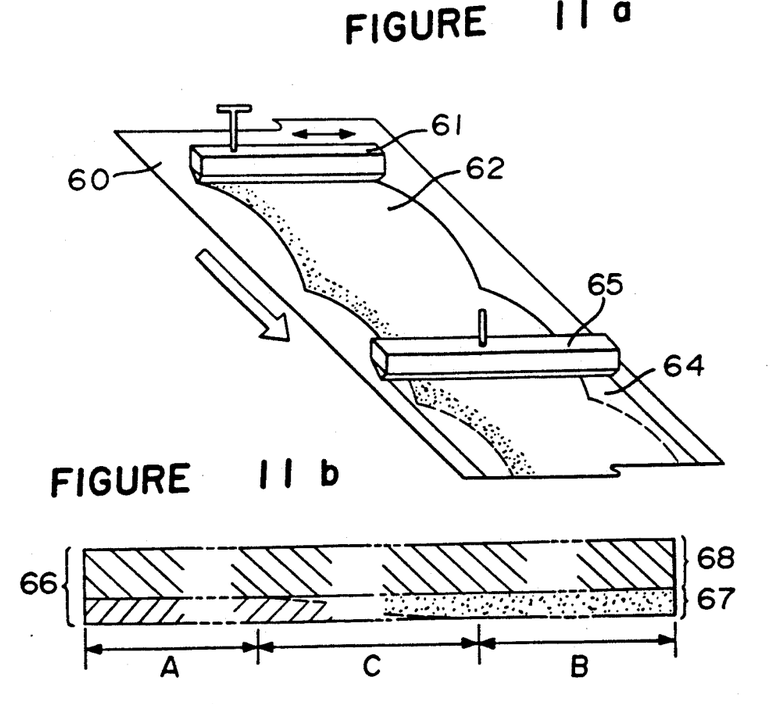
FIG. 11a is a perspective view of a two-step casting apparatus to be referred to for the description of the two-step casting method.
FIG. 11b shows a partial cross-sectional view of the two layer sheet thus obtained.

FIGS. 11a and 11b illustrate a method for producing a two-layered sheet by a two-step casting method. FIG. 11a is a perspective view showing the two-step casting apparatus, and FIG. 11b is a cross-sectional view showing the cross section of the two-layered sheet thereby produced. Onto a continuous substrate 60, a synthetic resin material 62 is firstly discharged from a first discharge die 61. This first discharge die 61 is the discharge die illustrated in FIGS. 9a to 9b. This discharge die 61 reciprocates in the left-right direction in the Figure and discharges synthetic resin materials 62 having different colors. The discharged synthetic resin materials 62 are cast and partially or completely cured while being passed through a heating furnace (not shown) to form a sheet 63 made of the first synthetic resin. This sheet 63 made of the first synthetic resin has a colored transparent strip zone (A), a transparent strip zone (B) and a boundary strip zone (C) as mentioned in the foregoing. Then, onto the formed sheet 63, a second synthetic resin material 64 is supplied from a second discharge die 65. This second synthetic resin material is preferably a material capable of forming a colorless or uniformly colored synthetic resin. The second discharge die 65 is preferably fixed. The discharged second synthetic resin material 64 is cast and then cured. As shown in FIG. 11b, the resulting laminated sheet 66 has a double-layered structure, wherein the underlayer 67 as the colored transparent strip zone (A), the transparent strip zone (B) and the boundary strip zone (C) as shown in FIG. 7, and the upper layer 68 is made of a colorless or uniformly colored transparent synthetic resin.

The preparation of the multi-layered sheet by a multi-step casting method is not restricted to the method shown in FIG. 11a. For example, in FIG. 11a, a two-layered sheet may be produced by exchanging the positions of the first and the second discharge dies. Namely, onto the continuous substrate 60, the second synthetic resin material 64 is firstly discharged from the second discharge die 65, cast and cured, and then the first synthetic resin material 62 is discharged from the first discharge die 61, cast and cured to obtain a two-layered sheet having an underlayer made of the second synthetic resin and an upper layer made of the first synthetic resin (having a colored transparent strip zone (A)).

The width of the continuous sheet (including the above-mentioned laminated sheet) of the synthetic resin in the present invention is preferably at least 50 cm depending upon the size of the glazing product for automobiles, as its main use. There is no particular restriction as to the upper limit of the width, but it is usually about 2 to 3 m. The thickness of the sheet is preferably from 0.04 to 4 mm, more preferably from 0.06 to 2 mm. In the case of a laminated sheet, the overall thickness is preferably from 0.02 to 4 mm, more preferably from 0.4 to 2 mm, and the thickness of the thinner layer is preferably from 0.04 to 1 mm. The width of the strip zone (C) is preferably at most ½, more preferably at most 1/5, of the width of the sheet. The lower limit is preferably about 1 cm, more preferably about 3 cm.

The continuous sheet (inclusive of the above-mentioned laminated sheet) of a synthetic resin in the present invention is useful as a material for producing a laminated safety glazing product for automobiles or for building materials. Namely, from this continuous sheet, a sheet of a suitable size is cut out and directly or by means of an adhesive or together with other synthetic resin sheet or film, laminated on a transparent inorganic glass sheet or organic glass sheet to obtain a laminated safety glazing product. It is particularly suitable as a material for BLW which is used as a windshield for automobiles.

When the continuous sheet in the present invention is a single layer synthetic resin, such a sheet will be used as the surface layer or inner layer of BLW. When used as the surface layer, the synthetic resin is preferably a cross-linked polyurethane resin having excellent self-healing properties. When used as an inner layer, the synthetic resin is preferably a thermoplastic or cross-linked polyurethane resin having high mechanical strength (which may have lower self-healing properties than the surface layer).

When the continuous sheet of the present invention is used as the surface layer, the synthetic resin of the continuous sheet is preferably a cross-linked polyurethane resin having both excellent self-healing properties and high mechanical strength. The above-mentioned laminated sheet may be directly or by means of an adhesive layer laminated on the above-mentioned inorganic glass sheet with its one side as the surface layer and the other side as the bonding the surface, to obtain BLW. For this surface layer, it is preferred to employ a cross-linked polyurethane resin having excellent self-healing properties. This surface layer may be formed by the above-mentioned multi-step casting method as the upperlayer or underlayer of the laminated sheet. The layer which does not constitute the surface layer is preferably a thermoplastic or cross-linked polyurethane resin having high mechanical strength (which may have lower self-healing properties than the surface layer). By using the surface of this inner layer as the bonding surface, the laminated sheet is bonded to an organic glass sheet to obtain BLW.

As the transparent synthetic resin, a polyurethane resin is particularly preferred. However, it may be a transparent synthetic resin formed by any other flowable synthetic resin material (a molten synthetic resin or a flowable mixture of reactive materials capable of forming a synthetic resin by reaction). As the polyurethane resin, a non-yellowing type polyurethane resin is used (a polyurethane resin obtained by using an aromatic polyisocyanate having an isocyanate group directly bonded to the aromatic nucleus is a yellowing type, and a polyurethane resin obtained by using an aliphatic polyisosianate, an alicyclic polyisocyanate and an aromatic polyisocyanate containing an isocyanate group not directly bonded to an aromatic nucleus is a non-yellowing type). The polyurethane resin may be a linear polyurethane resin having thermoplasticity or a cross-linked polyurethane resin (which may also be called a thermosetting polyurethane resin) having no thermoplasticity. Further, the polyurethane resin is preferably has excellent self-healing properties or high mechanical strength or both of such properties. The polyurethane resin having excellent self-healing properties is known and disclosed in e.g. U.S. Pat. Nos. 4,657,796, 4,684,694, or 3,979,548. The polyurethane resin having high mechanical strength is known and disclosed in e.g. European Patent 54491, Japanese Unexamined Patent Publication No. 135216/1984 or U.S. Pat. No. 4,600,653. The polyurethane resin having both excellent self-healing properties and high mechanical strength is known and disclosed in e.g. European Patent 131,523, U.S. Pat. No. 4,683,171 or Japanese Unexamined Patent Publication No. 222249/1985 or No. 281118/1986.

The casting method of the present invention is preferably conducted by using a mixture of reactive materials containing no substantial solvent, as the resin material (which may be called also as a bulk casting method). This mixture of reactive materials comprises a polyol and a polyisocyanate compound as the main components, and in many cases, further contains a chain extender such as a low molecular weight polyol or polyamine. Further, a small amount of a catalyst is usually incorporated. Further, a coloring agent is incorporated in at least one of the reactive material mixtures of the above-mentioned synthetic resin material (a') and the synthetic resin material (b'). If necessary, a stabilizer such as a ultraviolet absorber, an antioxidant, or a light stabilizer, or a moldability improving agent such as a leveling agent to improve the flowability or wettability of the mixture of reactive materials in casting, may be incorporated. However, it is undesirable to incorporate an additive which impairs the transparency of the synthetic resin, such as an inorganic filler.

The above-mentioned polyol is preferably a polyester polyol, a polycarbonate polyol, a polyoxytetramethylene polyol or a combination thereof. Further, each polyol may be a combination of polyols having different molecular weights or different number of hydroxyl groups. The molecular weight is preferably from about 20 to 500, more preferably from 40 to 400 as represented by the hydroxyl value. The number of hydroxyl groups is preferably from about 2 to 4, more preferably from about 2 to 3. When two or more polyols are used in combination, these values represent average values. When polyols having high molecular weights (i.e. low hydroxyl values) are used, it is preferred to incorporate a chain extender. The chain extender is a polyol having a relatively low molecular weight (usually not higher than 200) or a polyamine having a relatively low molecular weight. For example, it includes ethylene glycol, 1,4-butanediol, 1,6-hexanediol, diethanolamine, dimethylol propionic acid, hexamethylenediamine and isophoronediamine. As the polyisocyanate, a polyisocyanate having no isocyanate group directly bonded to the aromatic nucleus as mentioned above, may be employed. Specifically, for example, methylenebis(cyclohexyl isocyanate), isophorone diisocyanate, hexamethylene diisocyanate or xylylene diisocyanate, or a modified product thereof such as an urea modified product, a prepolymer type modified product or an amide modified product may be mentioned. Particularly preferred in an alicyclic diisocyanate or an aliphatic diisocyanate, or a modified product thereof. A mixture obtained by mixing such reactive starting materials or mixing a prepolymer obtained by a partial reaction thereof, with the rest of materials, is subjected to reaction and curing to obtain a polyurethane resin.

What is claimed is:
1. An elongated sheet or film of a transparent synthetic resin having a uniform thickness and smooth surface, which comprises a colored transparent strip zone (A) of a colored transparent synthetic resin (a) extending in the longitudinal direction of the sheet or film and a transparent strip zone (B) of a transparent synthetic resin (b) which is substantially the same as the colored transparent synthetic resin (a) except for the difference in color, said zone (B) extending in the longitudinal direction of the sheet or film, with the boundary of the zones (A) and (B) being partially curved, said strip zones (A) and (B) being contiguous in the same plane and contacting each other.

2. The sheet or film according to claim 1, which has a transparent boundary strip zone (C) between the colored transparent strip zone (A) and the transparent strip zone (B), wherein the thicknesses or the mixing proportions of the colored transparent synthetic resin (a) and the transparent synthetic resin (b) vary gradually in the width direction of the sheet or film so that the color varies gradually in the width direction of the sheet or film, and the boundaries of this transparent boundary strip zone (C) with the zones (A) and (B) being curved and in parallel to each other.

3. The sheet or film according to claim 2, wherein in the transparent boundary strip zone (C), the colored transparent synthetic resin (a) and the transparent synthetic resin (b) are overlapped to each other having no substantial discontinuous boundary except for the discontinuity in color.

4. The sheet or film according to claim 2, wherein the width of the transparent boundary strip zone (C) is at least 1 cm and at most ⅓ of the width of the sheet or film.

5. The sheet or film according to claim 1, wherein both the colored transparent synthetic resin (a) and the transparent synthetic resin (b) are made of the same cross-linked polyurethane resin having a self-healing property.

6. The sheet or film according to claim 1, which has a width of at least 50 cm and a thickness of from 0.04 to 4 mm.

7. A synthetic resin laminated sheet comprising a first transparent synthetic resin layer composed of a sheet or film of claim 1 and a second transparent synthetic resin layer which is colorless or uniformly colored.

8. The laminated sheet according to claim 7, wherein the first synthetic resin layer is made of a cross-linked polyurethane resin having a self-healing property, and the second synthetic resin layer is made of a synthetic resin having high mechanical strength.

9. The laminated sheet according to claim 7, which has a thickness of from 0.2 to 4 mm.

10. A laminated safety glazing product comprising at least two layers of a transparent synthetic resin sheet or film cut out from the elongated sheet or film of a transparent synthetic resin of claim 1 and at least one glass sheet selected from the group consisting of a transparent inorganic glass and a transparent organic glass.

11. The laminated safety glazing product according to claim 10, wherein one surface layer is an inorganic glass layer, and the other surface layer is a synthetic resin layer.

12. The laminated safety glazing product according to claim 11, wherein the synthetic resin of the surface layer is a cross-linked polyurethane resin having a self-healing property.

13. A laminated safety glazing product comprising at least two layers including a transparent laminated synthetic resin layer of a laminated sheet cut out from the elongated laminated sheet of claim 7 and at least one glass sheet layer selected from the group consisting of a transparent inorganic glass and a transparent organic glass.

14. The laminated safety glazing product according to claim 13, wherein the transparent laminated synthetic resin layer is disposed so that the first transparent synthetic resin layer thereof is located at the surface side and the second transparent synthetic resin layer thereof is located at the inner side.

15. The laminated safety glazing product according to claim 14, wherein the first transparent synthetic resin is a cross-linked polyurethane resin having a self-healing property.

16. The laminated safety glazing product according to claim 14, wherein the second transparent synthetic resin is a synthetic resin having a high mechanical strength.

17. The laminated safety glazing product according to claim 16, wherein the synthetic resin having high mechanical strength is a polyurethane resin.

* * * * *